US012595394B2

(12) United States Patent
Grubbs, III et al.

(10) Patent No.: US 12,595,394 B2
(45) Date of Patent: Apr. 7, 2026

(54) PLA / PHA BIODEGRADABLE COATINGS FOR SEEDS AND FERTILIZERS

(71) Applicant: Danimer IPCo, LLC, Bainbridge, GA (US)

(72) Inventors: Joe B. Grubbs, III, Bishop, GA (US); Jason John Locklin, Athens, GA (US)

(73) Assignee: Danimer IPCo, LLC, Bainbridge, GA (US)

( * ) Notice: Subject to any disclaimer, the term of this patent is extended or adjusted under 35 U.S.C. 154(b) by 15 days.

(21) Appl. No.: 16/880,083

(22) Filed: May 21, 2020

(65) Prior Publication Data

US 2020/0369909 A1 Nov. 26, 2020

Related U.S. Application Data

(60) Provisional application No. 62/852,433, filed on May 24, 2019.

(51) Int. Cl.

| | |
|---|---|
| *A01N 25/12* | (2006.01) |
| *C08G 63/06* | (2006.01) |
| *C09D 167/04* | (2006.01) |
| *A01C 1/06* | (2006.01) |
| *A01N 25/26* | (2006.01) |
| *C05G 5/30* | (2020.01) |

(52) U.S. Cl.
CPC ........... *C09D 167/04* (2013.01); *C08G 63/06* (2013.01); *A01C 1/06* (2013.01); *A01N 25/12* (2013.01); *A01N 25/26* (2013.01); *C05G 5/37* (2020.02)

(58) Field of Classification Search
CPC ................................ A01N 25/26; A01N 25/12
See application file for complete search history.

(56) References Cited

U.S. PATENT DOCUMENTS

| | | | |
|---|---|---|---|
| 6,036,971 A | 3/2000 | Kimoto et al. | |
| 7,811,352 B2 | 10/2010 | Binder et al. | |
| 8,822,584 B2 | 9/2014 | Whitehouse | |
| 8,937,135 B2 * | 1/2015 | Steinke | C08L 67/02 |
| | | | 525/445 |
| 9,206,311 B2 | 12/2015 | Steinke et al. | |
| 9,328,239 B2 | 5/2016 | Krishnaswamy | |
| 9,353,258 B2 | 5/2016 | Krishnaswamy et al. | |
| 10,113,060 B2 | 10/2018 | Krishnaswamy et al. | |
| 2010/0189799 A1 | 7/2010 | Watanabe | |
| 2014/0106964 A1 | 4/2014 | Jogikalmath et al. | |
| 2015/0094416 A1 | 4/2015 | Steinke et al. | |
| 2016/0257098 A1 * | 9/2016 | Nissenbaum | B29C 48/92 |
| 2017/0088480 A1 * | 3/2017 | Kannan | C05G 5/38 |
| 2017/0181427 A1 | 6/2017 | Shani et al. | |
| 2018/0334564 A1 | 11/2018 | Andrews et al. | |

FOREIGN PATENT DOCUMENTS

| | | | |
|---|---|---|---|
| JP | 10101911 A | * | 4/1998 |
| WO | 2016172039 A1 | | 10/2016 |
| WO | 2017087265 A1 | | 5/2017 |
| WO | 2018058193 A1 | | 4/2018 |

OTHER PUBLICATIONS

International Search Report and Written Opinion for PCT/US2020/033942, dated Aug. 28, 2020, 13 pages.
Thibaud, Gerard, et al., PLA-PHA blends: morphology, thermal and mechanical properties. International Conference on Biodegradable and Biobased Polymers—BIOPOL Strasbourg, France, Aug. 2011.

* cited by examiner

*Primary Examiner* — Bethany P Barham
*Assistant Examiner* — Danielle Johnson
(74) *Attorney, Agent, or Firm* — Myers Bigel, P.A.

(57) ABSTRACT

A granular composition for agricultural is disclosed. The granular composition is made up of a plurality of granulates having a biodegradable coating applied over the granulates. The granulates are selected from the group consisting of seeds, fertilizers, and pesticides. The biodegradable coating is made up of polylactic acid and polyhydroxyalkanoates. A method for making the coated granular composition and a method for controlled release of the granular material in the field are also disclosed.

24 Claims, No Drawings

PLA / PHA BIODEGRADABLE COATINGS FOR SEEDS AND FERTILIZERS

FIELD

This disclosure relates to biodegradable polymeric compositions. More particularly, this disclosure relates to biodegradable coatings for seeds and fertilizers made up of polylactic acid ("PLA") and polyhydroxyalkanoates ("PHA's").

BACKGROUND

Plants uptake nutrients at various rates based on environmental conditions, but the most critical time for nutrient uptake is during the plant's early development. The nutrients must be plentiful during this time. However, excess nitrogen uptake may over-stimulate vegetative growth and delay crop maturity. Thus, the timing of nutrient uptake is crucial to maximize crop fields.

To address these issues, controlled release fertilizers (CRFs) have been produced wherein fertilizers are encapsulated by a petroleum polymer coating that slowly releases the fertilizer into the soil. Thus, nutrients may be delivered at a pace more compatible with the plant's metabolic needs. Changes in temperature, humidity, or bioactivity of the soil, however, can unpredictably alter this rate resulting in negative effects on crop yields by providing the incorrect amount of nutrients at the incorrect time. Thus far, the commercial application of CRFs is limited due to the lack of data about the release kinetics in different environmental conditions. Furthermore, the petroleum-based coating applied to the fertilizer is not environmentally friendly and may persist in the environment for years after the application of the fertilizer.

Thus, it would be desirable to provide a new controlled release fertilizer formulation having a coating which is non-harmful to the environment and which does not persist past the growing season. It would also be desirable to provide a new controlled release fertilizer formulation having a more predictable and controllable fertilizer release rate.

SUMMARY OF THE INVENTION

The above and other needs are met by a granular composition for agricultural use in accordance with the current disclosure. According to one embodiment, this granular composition is made up of a plurality of granulates having a biodegradable coating applied over the granulates. These granulates, in turn, are made up of a material selected from the group consisting of seeds, fertilizers, and pesticides. The biodegradable coating is made up of from about 5 to about 75 weight percent polylactic acid and from about 25 to about 95 weight percent polyhydroxyalkanoates.

In certain embodiments, the granulates of the composition are preferably made up of seeds. In other embodiments, the granulates of the composition are preferably made up of fertilizer, more preferably a urea-based fertilizer.

As noted, the biodegradable coating includes both polylactic acid (PLA) and a polyhydroxyalkanoate (PHA). In certain embodiments, the biodegradable coating preferably includes polylactic acid having a weight average molecular weight from about 10,000 to about 250,000 Daltons. Also, in certain embodiments, the biodegradable coating preferably includes polyhydroxyalkanoates having a weight average molecular weight from about 50,000 to about 2.5 million Daltons.

In a more preferred embodiment, the biodegradable coating is preferably made up of from about 10 to about 50 weight percent polylactic acid and from about 50 to about 90 weight percent polyhydroxyalkanoates.

In certain embodiments, the polyhydroxyalkanoates within the biodegradable coating are preferably made up of from about 70 to about 99 mole percent monomer residues of 3-hydroxybutyrate and from about 1 to about 30 mole percent monomer residues of 3-hydroxyhexanoate.

In some embodiments, the polyhydroxyalkanoates within the biodegradable coating may be made up of three or more different types of hydroxyalkanoate monomer residues, each having from 5 to 22 carbon atoms.

In a preferred embodiment, the granulates preferably have an average particle size, before coating, from about 1 to about 25 mm.

Further, in certain embodiments, the biodegradable coating preferably includes a continuous phase of polylactic acid having globules of the polyhydroxyalkanoates homogenously dispersed therein, wherein the globules have an average size of from about 2 nm to about 10 microns.

In another aspect, the present disclosure provides a method for making a coated granular composition. In one embodiment, the method includes a step of mixing polylactic acid, a polyhydroxyalkanoate, and optionally a solvent, at a temperature from about 25° C. to about 180° C. to provide a coating mixture. This coating mixture is then applied over outer surfaces of a plurality of granulates. The method also includes a step of solidifying the coating mixture to create a biodegradable coating over the outer surfaces of the plurality of granulates. The granulates coated according to the method made up of a material selected from the group consisting of seeds, fertilizers, and pesticides. Once solidified, the biodegradable coating is made up of a continuous phase of polylactic acid having globules of the polyhydroxyalkanoates homogenously dispersed therein. These globules have an average size of from about 2 nm to about 10 microns.

In certain embodiments of the method, the biodegradable coating is annealed briefly after application at 150-170° C. for a few seconds or the biodegradable coating is exposed to solvent vapors after coating.

In certain embodiments of the method, the granulates of the composition are preferably made up of seeds. In other embodiments of the method, the granulates of the composition are preferably made up of fertilizer, more preferably a urea-based fertilizer.

In certain embodiments of the method, the biodegradable coating preferably includes polylactic acid having a weight average molecular weight from about 10,000 to about 250,000 Daltons. Also, in certain embodiments of the method, the biodegradable coating preferably includes polyhydroxyalkanoates having a weight average molecular weight from about 50,000 to about 2.5 million Daltons.

In a more preferred embodiment of the method, the biodegradable coating is preferably made up of from about 10 to about 50 weight percent polylactic acid and from about 50 to about 90 weight percent polyhydroxyalkanoates.

In certain embodiments of the method, the polyhydroxyalkanoates within the biodegradable coating is preferably made up of from about 70 to about 99 mole percent monomer residues of 3-hydroxybutyrate and from about 1 to about 30 mole percent monomer residues of 3-hydroxyhexanoate.

In some embodiments of the method, the polyhydroxyalkanoates within the biodegradable coating may be made up of three or more different types of hydroxyalkanoate monomer residues, each having from 5 to 22 carbon atoms.

In a preferred embodiment of the method, the granulates preferably have an average particle size, before coating, from about 1 to about 25 mm.

In a further aspect, the present disclosure provides a method for controlled release of a granular material. According to one embodiment, the method includes an initial step of providing a granular composition made up of a plurality of granulates having a biodegradable coating applied over the granulates. These granulates in turn are made up of a material selected from the group consisting of seeds, fertilizers, and pesticides. The biodegradable coating is made up of from about 5 to about 75 weight percent polylactic acid and from about 25 to about 95 weight percent polyhydroxyalkanoates.

In a second step, the granular composition is dispersed over a plot of soil.

At least the polyhydroxyalkanoates in the biodegradable coating are then dissolved by exposing the plot of soil, and the granular composition dispersed therein, to moisture. The dissolution of the polyhydroxyalkanoates leads to formation of a plurality of channels in the biodegradable coating through which the granulate material may be released into the soil.

In a more preferred embodiment of the method, the biodegradable coating is preferably made up of from about 10 to about 50 weight percent polylactic acid and from about 50 to about 90 weight percent polyhydroxyalkanoates.

In certain embodiments of the method, the polyhydroxyalkanoates within the biodegradable coating is preferably made up of from about 70 to about 99 mole percent monomer residues of 3-hydroxybutyrate and from about 1 to about 30 mole percent monomer residues of 3-hydroxyhexanoate.

In some embodiments of the method, the polyhydroxyalkanoates within the biodegradable coating may be made up of three or more different types of hydroxyalkanoate monomer residues, each having from 5 to 22 carbon atoms. For instance, the polyhydroxyalkanoates may in some instances be made up of monomer residues of 3-hydroxybutyrate, monomer residues of 3-hydroxyvalerate, and monomer residues of 3-hydroxyhexanoate.

In other instances, the polyhydroxyalkanoates may be made up of at least three different type of monomer residues selected from the group consisting of monomer residues of 3-hydroxybutyrate, monomer residues of 4-hydroxybutyrate, monomer residues of 3-hydroxyvalerate, monomer residues of 3-hydroxyhexanoate, monomer residues of 3-hydroxyoctanoate, and monomer residues of 3-hydroxydecanoate.

In certain embodiments of the method, the biodegradable coating preferably includes a continuous phase of polylactic acid having globules of the polyhydroxyalkanoates homogeneously dispersed therein, wherein the globules have an average size of from about 2 nm to about 10 microns.

In certain embodiments of the method, at least about 10 to 50 percent of the polyhydroxyalkanoates in the biodegradable coating has started to degrade or has degraded after about 21 days exposure to moisture in the plot of soil.

DETAILED DESCRIPTION

Granular Composition

According to the present disclosure, a granular composition for agricultural use is provided. This granular composition is made up of a plurality of granulates having a biodegradable coating applied over the granulates.

The granulates may be made up of various materials agriculturally useful materials. In general, the granulates may be made up of a material selected from the group consisting of seeds, fertilizers, and pesticides. In some instances, the granulates of the composition are preferably made up of seeds. Examples of seeds which may be used in the granular composition include grass seeds, fruit and nut tree seeds, and vegetable plant seeds.

In other embodiments, the granulates of the composition are preferably made up of fertilizer. Fertilizers which may be provided as a coated granular composition according to the present disclosure include nitrogen, phosphorous, and potassium-based fertilizers. In a particularly preferred example, the fertilizer may be a urea-based fertilizer.

In still other instances, the granulates may be made up of a pesticide. In general, any solid pesticide material may be provided as a coated granular composition according to the present disclosure, including inorganic pesticides, organic pesticides, and biopesticides. Examples of such pesticides including but not limited to pesticides containing ammonium nitrate, potassium chloride, sodium phosphate, calcium sulfate, chlorpyrifos, metribuzin, chlorimuron ethyl, atrazine, S-metolachlor, cyanazine, viral-based biopesticides, and bacterial-based biopesticides.

The size of the granulates will vary depending upon the nature of the granulate material. In general, the granulates will have an average particle size, before coating, from about 1 to about 25 mm. More particularly, for seeds, the granulates may preferably have an average particle size, before coating, from about 1 to about 25 mm. For fertilizers, the granulates may preferably have an average particle size, before coating, from about 1 to about 8.5 mm. For pesticides, the granulates may preferably have an average particle size, before coating, from about 1 to about 10 mm.

According to the present disclosure, a biodegradable coating which includes both polylactic acid (PLA) and polyhydroxyalkanoates (PHA's) is applied over the granulates.

Although the exact proportions of PLA and PHA's in the biodegradable coating may vary somewhat, the coating is generally made up of from about 5 to about 75 weight percent polylactic acid and from about 25 to about 95 weight percent polyhydroxyalkanoates. More preferably, the biodegradable coating is made up of from about 10 to about 50 weight percent polylactic acid and from about 50 to about 90 weight percent polyhydroxyalkanoates.

The molecular weight ranges for the PLA and the PHAs may also vary somewhat. In certain embodiments, the biodegradable coating preferably includes polylactic acid having a weight average molecular weight from about 10,000 to about 250,000 Daltons. Further, in some instances, the biodegradable coating preferably includes polyhydroxyalkanoates having a weight average molecular weight from about 50,000 to about 2.5 million Daltons.

Further, there are multiple forms of polyhydroxyalkanoates including for instance, monomer residues of 3-hydroxybutyrate, monomer residues of 4-hydroxybutyrate, monomer residues of 3-hydroxyvalerate, monomer residues of 3-hydroxyhexanoate, hydroxyoctanoates, and hydroxydecanoates. Preferably the polyhydroxyalkanoates within the biodegradable coating is preferably made up of from about 70 to about 99 mole percent monomer residues of 3-hydroxybutyrate and from about 1 to about 30 mole percent monomer residues of 3-hydroxyhexanoate.

In some embodiments of the method, the polyhydroxyalkanoates within the biodegradable coating may be made up of three or more different types of hydroxyalkanoate monomer residues, each having from 5 to 22 carbon atoms. For instance, the polyhydroxyalkanoates may in some instances be made up of monomer residues of 3-hydroxybutyrate, monomer residues of 3-hydroxyvalerate, and monomer residues of 3-hydroxyhexanoate.

In other instances, the polyhydroxyalkanoates may be made up of at least three different type of monomer residues selected from the group consisting of monomer residues of 3-hydroxybutyrate, monomer residues of 4-hydroxybutyrate, monomer residues of 3-hydroxyvalerate, monomer residues of 3-hydroxyhexanoate, monomer residues of 3-hydroxyoctanoate, and monomer residues of 3-hydroxydecanoate.

In some embodiment, the biodegradable coating may also include relatively small amounts (typically 0.3 to 10% by weight) of other additives, such as polyvinyl acetate, clay, calcium, talc, polysaccharides (such as starch), pentaerythritol, and sulfur.

Importantly, when the applied biodegradable coating of the present disclosure is examined under magnification, the biodegradable coating preferably includes a continuous phase of polylactic acid having globules of the polyhydroxyalkanoates dispersed therein. Preferably these globules have an average size of from about 2 nm to about 10 microns.

As used herein, the term "biodegradable" describes a material which can be decomposed or broken down by microbes or living organisms in the soil. In general, it is preferred that at least about 50 weight percent of the coating be made up of materials which are biodegradable. More preferably, 100 percent of the materials which make up the coating are biodegradable.

It is also preferred that the biodegradable coating includes no more than about 1.0 weight percent of polyurethane. More preferably, the biodegradable coating includes no polyurethane at all.

Preparation of the Granular Composition

In another aspect, the present disclosure provides a method for making a coated granular composition. In one embodiment, the method includes a step of mixing polylactic acid, a polyhydroxyalkanoate, and optionally a solvent, at a temperature from about 25° C. to about 180° C. to provide a coating mixture. This coating mixture is then applied over outer surfaces of a plurality of granulates. The method also includes a step of solidifying the coating mixture to create a biodegradable coating over the outer surfaces of the plurality of granulates. The granulates coated according to the method made up of a material selected from the group consisting of seeds, fertilizers, and pesticides. Once solidified, the biodegradable coating is made up of a continuous phase of polylactic acid having globules of the polyhydroxyalkanoates homogeneously dispersed therein. These globules have an average size of from about 2 nm to about 10 microns.

In certain embodiments of the method, the biodegradable coating is annealed briefly after application at 150-170° C. for a few seconds or the biodegradable coating is exposed to solvent vapors after coating.

In certain embodiments of the method, the granulates of the composition are preferably made up of seeds. In other embodiments of the method, the granulates of the compositions are preferably made up of fertilizer, more preferably a urea-based fertilizer.

Usage of the Granular Composition

The coated granular compositions of the present disclosure are suitable used for agricultural purposes. In particular, the granular compositions of the present disclosure may be used to provide a method for controlled release of the granular material.

According to this method, the coated granular composition is provided as discussed above. Again, the granulates may be made up of a material selected from the group consisting of seeds, fertilizers, and pesticides This granular composition is dispersed over a plot of soil being treated with the composition. The application rate may vary depending upon the nature of the granulates being applied. For a coated fertilizer granulate, the granular composition may be dispersed over a soil at a rate of about 10 to about 50 pounds per acre. For a coated pesticide granulate, the granular composition may be dispersed over a soil at a rate of about 1 to about 10 pounds per acre.

Once dispersed over the soil, the soil plot is exposed to moisture in the form of rain, irrigation, and/or ambient water vapor. Consequently, the coated granulates of the granular composition are likewise exposed to moisture.

This exposure to moisture causes at least the polyhydroxyalkanoates in the biodegradable coating to begin to undergo decomposition by hydrolysis. Thus, at least the polyhydroxyalkanoates gradually dissolve into smaller oligomers and monomers. In some instances, the polylactic acid may also decompose into smaller oligomers and monomers. However, it is believed that the polylactic acid will generally decompose or hydrolyze at a slower rate than the polyhydroxyalkanoates As this decomposition proceeds, the lower molecular weight decomposition products may be dissolved in water or otherwise leached away from the granulates, thereby creating gaps in the biodegradable coating and exposing a portion of the granulate material underneath the coating. This exposed portion of the granulate material may then be released into the soil.

As noted above, the biodegradable coating preferably includes a continuous phase of polylactic acid having globules of the polyhydroxyalkanoates dispersed therein, and the polyhydroxyalkanoates in the globules will generally dissolve at a faster rate than the polylactic acid in the adjacent continuous phase. Consequently, this dissolution of the polyhydroxyalkanoates preferably leads to formation of a plurality of channels or pores in the biodegradable coating.

Thus, in a more preferred embodiment, the underlying granulate material may be released into the soil through these channels or pores now formed in the biodegradable coating.

Since the granulate is released through the channels or pores, it follows that the rate of release of the granulate material is largely determined by the rate of decomposition of the polyhydroxyalkanoates when exposed to environmental moisture. In turn, the rate of decomposition may be affected by factors such as the specific polyhydroxyalkanoates used in the coating (monomer residues of 3-hydroxybutyrates, monomer residues of 3-hydroxyhexanoates, and so forth) and the weight average molecular weight of the polyhydroxyalkanoates.

Advantageously then, those of skill in the art may effectively control the rate of release of the granulate material (seed, fertilizer, pesticide, etc.) by selection of an appropriate type and amount of polyhydroxyalkanoates for the biodegradable coating.

In certain embodiments of the method, at least about 50 percent of the polyhydroxyalkanoates in the biodegradable coating are preferably dissolved after about 21 days exposure to moisture in the plot of soil.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A granular composition for agricultural use comprising:
a plurality of granulates having a biodegradable coating applied over the granulates,
wherein the granulates comprise a material selected from the group consisting of seeds, fertilizers, and pesticides, and
wherein the biodegradable coating comprises from about 5 to about 75 weight percent polylactic acid and from about 25 to about 95 weight percent polyhydroxyalkanoates,
wherein the biodegradable coating is annealed at 150-170° C. or exposed to solvent vapors after application to form a continuous phase of polylactic acid having globules of the polyhydroxyalkanoates homogeneously dispersed within the continuous phase, wherein the globules have an average size of from about 2 nm to about 10 micron.

2. The granular composition of claim 1, wherein the granulates comprise seeds.

3. The granular composition of claim 1, wherein the granulates comprise fertilizer.

4. The granular composition of claim 1, wherein the granulates comprise pesticide.

5. The granular composition of claim 1, wherein the biodegradable coating comprises polylactic acid having a weight average molecular weight from about 10,000 to about 250,000 Daltons.

6. The granular composition of claim 1, wherein the biodegradable coating comprises polyhydroxyalkanoates having a weight average molecular weight from about 50,000 to about 2.5 million Daltons.

7. The granular composition of claim 1, wherein the granulates have an average particle size, before coating, from about 1 to about 25 mm.

8. The granular composition of claim 1, wherein the biodegradable coating comprises from about 10 to about 50 weight percent polylactic acid and from about 50 to about 90 weight percent polyhydroxyalkanoates.

9. The granular composition of claim 1, wherein the polyhydroxyalkanoates comprise from about 70 to about 99 mole percent monomer residues of 3-hydroxybutyrate and from about 1 to about 30 mole percent monomer residues of 3-hydroxyhexanoate.

10. The granular composition of claim 1, wherein the polyhydroxyalkanoates comprise three or more different types of hydroxyalkanoate monomer residues, each having from 5 to 22 carbon atoms.

11. A method for making a coated granular composition, comprising the steps of:

mixing polylactic acid and a polyhydroxyalkanoate, optionally in the presence of a solvent, at a temperature from about 25° C. to about 180° C. to provide a coating mixture;
applying the coating mixture over outer surfaces of a plurality of granulates comprising a material selected from the group consisting of seeds, fertilizers, and pesticides;
solidifying the coating mixture to create a biodegradable coating over the outer surfaces of the plurality of granulates, and
annealing the biodegradable coating in order to form a continuous phase of polylactic acid having globules of the polyhydroxyalkanoates homogeneously dispersed within the continuous phase, wherein the globules have an average size of from about 2 nm to about 10 micron, wherein the annealing comprises thermal annealing at 150-170° C. or solvent annealing by exposing the biodegradable coating to solvent vapors.

12. The method of claim 11, wherein the granulates comprise seeds.

13. The method of claim 11, wherein the granulates comprise fertilizer.

14. The method of claim 11, wherein the granulates comprise pesticide.

15. The method of claim 11, wherein the biodegradable coating comprises polylactic acid having a weight average molecular weight from about 10,000 to about 250,000 Daltons.

16. The method of claim 11, wherein the biodegradable coating comprises polyhydroxyalkanoates having a weight average molecular weight from about 50,000 to about 2.5 million Daltons.

17. The method of claim 11, wherein the granulates have an average particle size, before coating, from about 1 to about 25 mm.

18. The method of claim 11, wherein the solid biodegradable coating comprises from about 10 to about 30 weight percent polylactic acid and from about 70 to about 90 weight percent polyhydroxyalkanoates.

19. The method of claim 11, wherein the polyhydroxyalkanoates comprise from about 70 to about 99 mole percent monomer residues of 3-hydroxybutyrate and from about 1 to about 30 mole percent monomer residues of 3-hydroxyhexanoate.

20. The method of claim 11, wherein the polyhydroxyalkanoates comprise three or more different types of hydroxyalkanoate monomer residues, each having from 5 to 22 carbon atoms.

21. A method for controlled release of a granular material, comprising the steps of:
providing a granular composition according to claim 1;
dispersing the granular composition over a plot of soil;
dissolving at least the polyhydroxyalkanoates in the biodegradable coating by exposing the plot of soil, and the granular composition dispersed therein, to moisture,
wherein dissolution of the polyhydroxyalkanoates forms a plurality of channels in the biodegradable coating through which the granulate material may be released into the soil.

22. The method of claim 21, wherein the biodegradable coating comprises from about 10 to about 30 weight percent polylactic acid and from about 70 to about 90 weight percent polyhydroxyalkanoates.

23. The method of claim 21, wherein the polyhydroxyalkanoates comprise from about 70 to about 99 mole percent monomer residues of 3-hydroxybutyrate and from about 1 to about 30 mole percent monomer residues of 3-hydroxy-hexanoate.

24. The method of claim 21, wherein at least about 50 percent of the polyhydroxyalkanoates in the biodegradable coating are dissolved after about 21 days exposure to moisture in the plot of soil.

* * * * *